(12) United States Patent
Yeh et al.

(10) Patent No.: US 8,414,247 B2
(45) Date of Patent: Apr. 9, 2013

(54) METHOD FOR RELOADING WORKPIECE

(75) Inventors: Chi-Hsien Yeh, Taipei Hsien (TW);
Zhong Qin, Shenzhen (CN); Zheng-Jie Han, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 878 days.

(21) Appl. No.: 12/511,267

(22) Filed: Jul. 29, 2009

(65) Prior Publication Data
US 2010/0068015 A1  Mar. 18, 2010

(30) Foreign Application Priority Data

Sep. 16, 2008 (CN) .......................... 2008 1 0304521

(51) Int. Cl.
*B25J 15/06* (2006.01)
(52) U.S. Cl. ............. 414/800; 901/40; 901/30; 414/735
(58) Field of Classification Search .................. 414/735, 414/800, 806; 901/40, 29, 30; 294/188, 294/65; 74/490.06
See application file for complete search history.

(56) References Cited

U.S. PATENT DOCUMENTS

| | | | | |
|---|---|---|---|---|
| 4,416,577 A | * | 11/1983 | Inaba et al. | 414/225.01 |
| 4,915,565 A | * | 4/1990 | Bond et al. | 29/740 |
| 7,028,392 B1 | * | 4/2006 | Schiebel | 29/740 |
| 2002/0114690 A1 | * | 8/2002 | Ishigame | 414/744.5 |

* cited by examiner

*Primary Examiner* — Donald Underwood
(74) *Attorney, Agent, or Firm* — Altis Law Group, Inc.

(57) ABSTRACT

A method for reloading workpieces includes providing a manipulator having a connecting base and a plurality of grasping assemblies arranged on the connecting base, providing a plurality of original workpieces and a plurality of machined workpieces positioned in a plurality of machining positions, grasping the original workpieces by at least one grasping assembly, with at least one grasping assembly vacant, grasping one machined workpiece by one vacant grasping assembly, rotating the connecting base, so that one original workpiece is placed in one machining position by one grasping assembly, further rotating the connecting base until another vacant grasping assembly is opposite to another machining position, and repeating grasping the machined workpieces from the machining positions and placing the original workpieces on the machining positions until a last original workpiece is placed on one machining position. The manipulator used in the present method for reloading workpieces is also provided.

9 Claims, 15 Drawing Sheets

METHOD FOR RELOADING WORKPIECE

BACKGROUND

1. Technical Field

The present disclosure relates generally to methods for reloading workpieces and, more particularly, to a method for reloading workpieces using a manipulator.

2. Description of Related Art

Industrial robotic machines are widely used in the manufacturing industry to achieve high efficiency. A manipulator generally has a claw for holding a workpiece in a machining process.

A typical industrial robotic machine includes a first manipulator and a second manipulator, each manipulator including a main body and a plurality of claws assembled at an end of the main body. The first manipulator grasps a plurality of first workpieces, and places the first workpieces on a plurality of machining positions of a machine center. When the first workpieces are machined by the machining center, the second manipulator grasps a plurality of second workpieces. After the first workpieces are machined to desired products, the first manipulator grasps the products and transports the products away from the machining center. The second manipulator places the second workpieces on the machining positions of the machine tool for machining.

The method of using two manipulators to reduce waiting time for the machine tool increases machining cost of the products because of the use of two manipulators.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
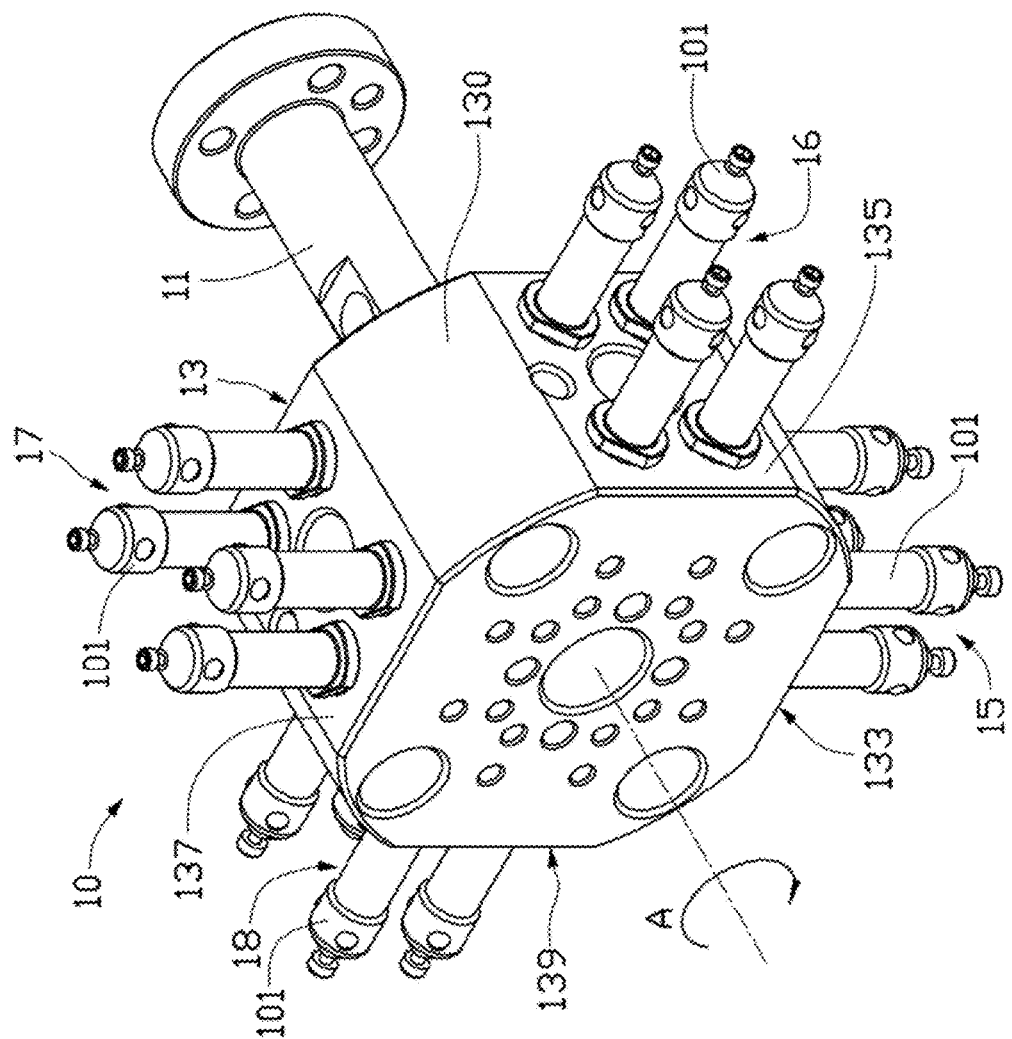
FIG. 1 is an isometric view of a first embodiment of a manipulator.

Referring to FIG. 1, a first embodiment of a manipulator 10 includes a support arm 11, a connecting base 13, a first grasping assembly 15, a second grasping assembly 16, a third grasping assembly 17, and a fourth grasping assembly 18. Each of the first grasping assembly 15, the second grasping assembly 16, the third grasping assembly 17, and the fourth grasping assembly 18 includes a plurality of substantially parallel grasping poles 101.

The support arm 11 may be a cylindrical pole. An end of the support arm 11 is connected to a driving device (not shown), such as a motor, and the other end of the support arm 11 is connected to the connecting base 13. The support arm 11 and the connecting base 13 are rotated by the driving device.

The connecting base 13 may be substantially cubic. In the illustrated embodiment, the connecting base 13 includes a plurality of curved surfaces 130, a first side surface 133, a second side surface 135, a third side surface 137, and a fourth side surface 139. The first side surface 133, the second side surface 135, the third side surface 137, and the fourth side surface 139 connect in turn via the curved surfaces 130, and are substantially perpendicular to each other.

The first grasping assembly 15 is substantially perpendicularly positioned on the first side surface 133. The second grasping assembly 16 is substantially perpendicularly positioned on the second side surface 135. The third grasping assembly 17 is substantially perpendicularly positioned on the third side surface 137. The fourth grasping assembly 18 is substantially perpendicularly positioned on the fourth side surface 139. That is, the first grasping assembly 15 is substantially perpendicular to the second grasping assembly 16, the second grasping assembly 16 is substantially perpendicular to the third grasping assembly 17, the third grasping assembly 17 is substantially perpendicular to the fourth grasping assembly 18, and the fourth grasping assembly 18 is substantially perpendicular to the first grasping assembly 15.

Figure 2:
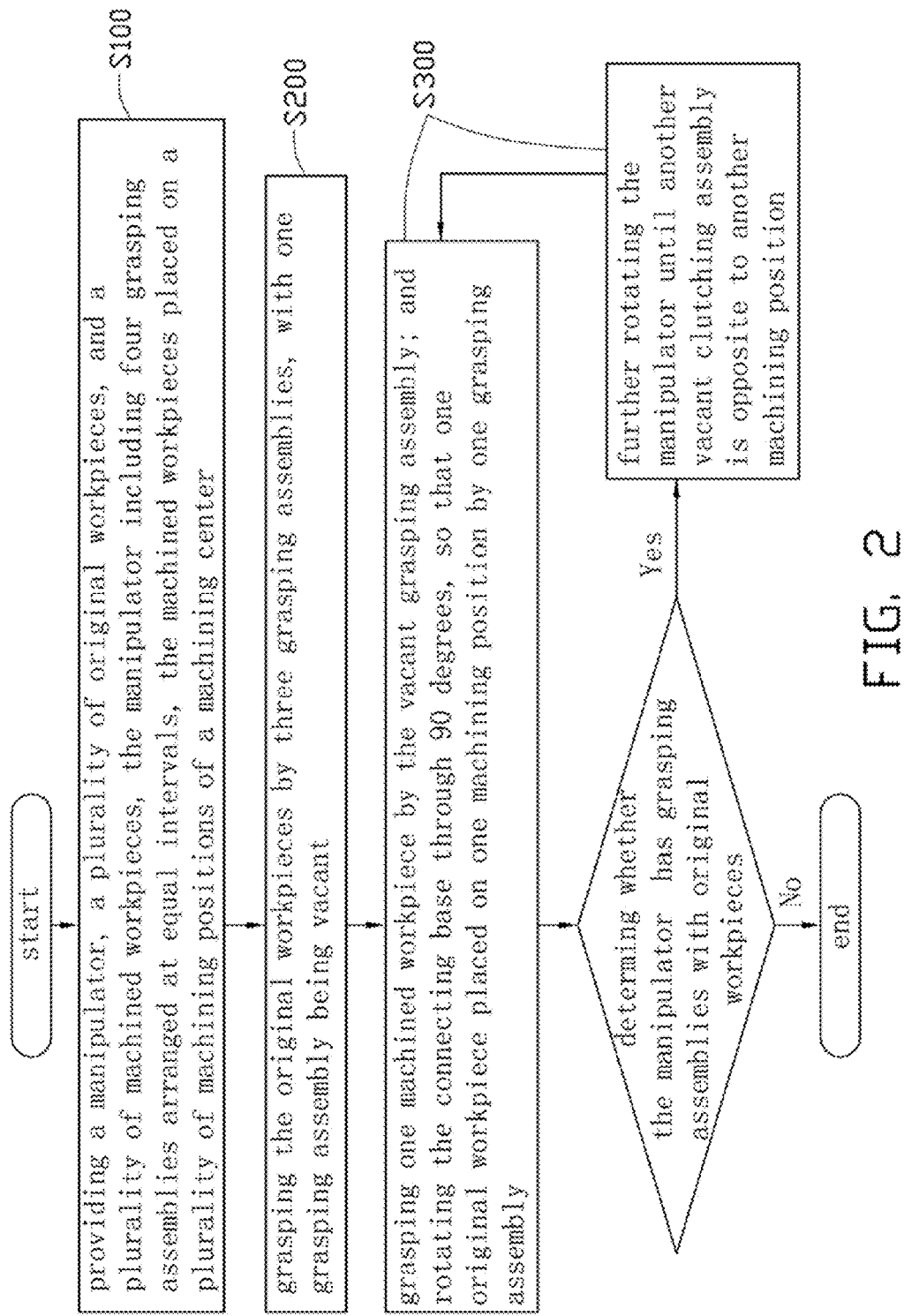
FIG. 2 is a flowchart of one embodiment of a method for reloading workpieces using the manipulator of FIG. 1.

A method for reloading a plurality of workpieces using the manipulator 10, according to FIG. 2, is provided.

Figure 3:
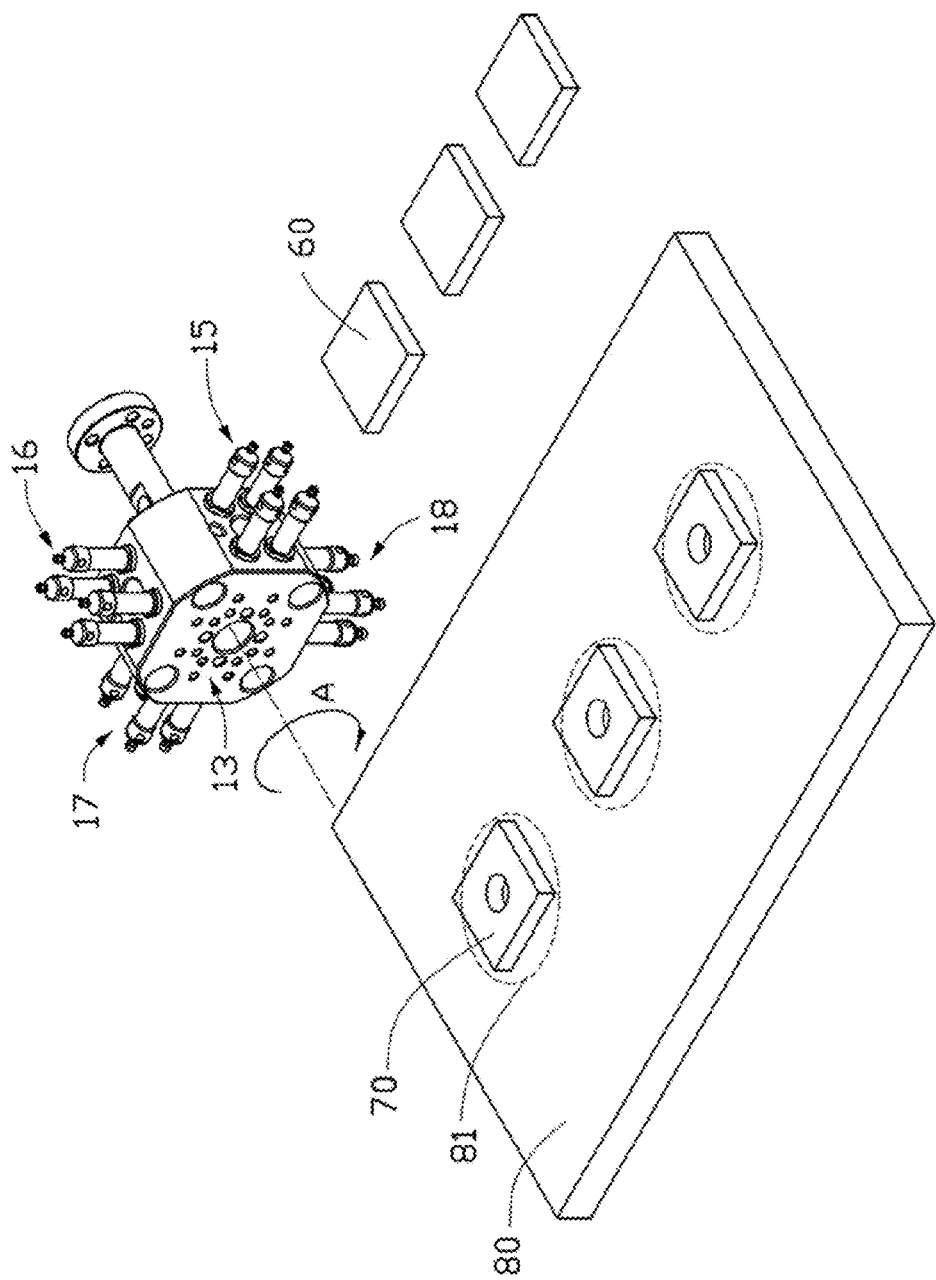
FIGS. 3 to 9 show a process of reloading workpieces using the manipulator of FIG. 1.

Referring also to FIG. 3, in a step S100, the manipulator 10, a plurality of original workpieces 60, and a plurality of machined workpieces 70 are provided. The machined workpieces are placed on a plurality of machining positions 81 of a machining center 80.

Figure 4:
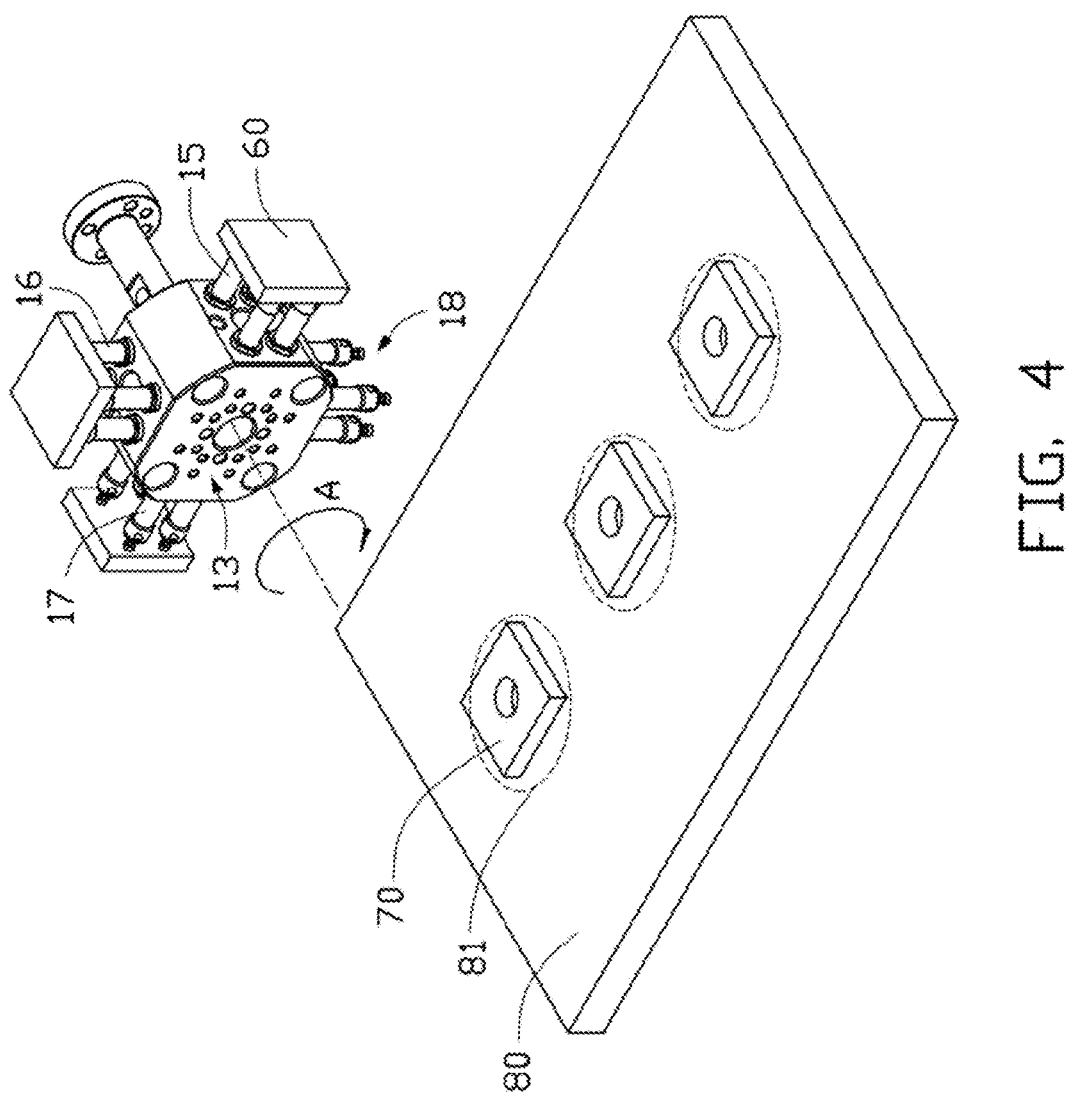

In a step S200, the manipulator 10 is rotated such that first grasping assembly 15 corresponds to a first of the plurality of original workpieces 60. The first grasping assembly of the manipulator 10 grasps the first of the plurality of original workpieces 60 via the grasping poles 101. The manipulator 10 rotates 90° in a direction A, and the second grasping assembly 16 corresponds to a second of the plurality of original workpieces 60. The second grasping assembly 16 grasps the second of the plurality of original workpieces 60 via the grasping poles 101. The manipulator 10 further rotates 90° in the direction A, and the third grasping assembly 17 corresponds to a third of the plurality of original workpieces 60. The third grasping assembly 17 grasps the third of the plurality of original workpieces 60 via the grasping poles 101. The manipulator 10 rotates 90° in the direction A, and moves to a first of the plurality of machining positions 81 of the machining center 80, therefore, the fourth grasping assembly 18 faces the first of the plurality of machining positions 81 (as shown in FIG. 4).

Figure 5:
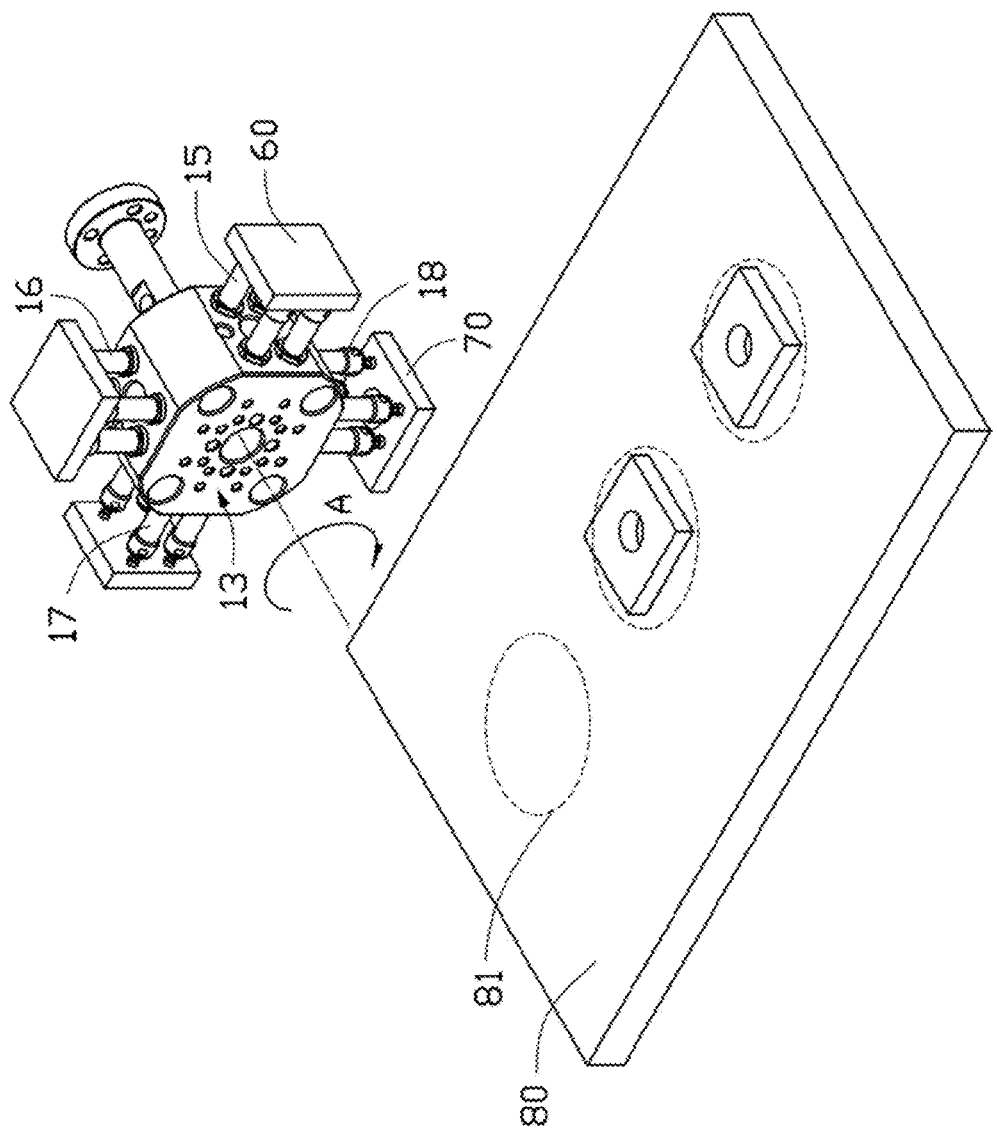
Figure 6:
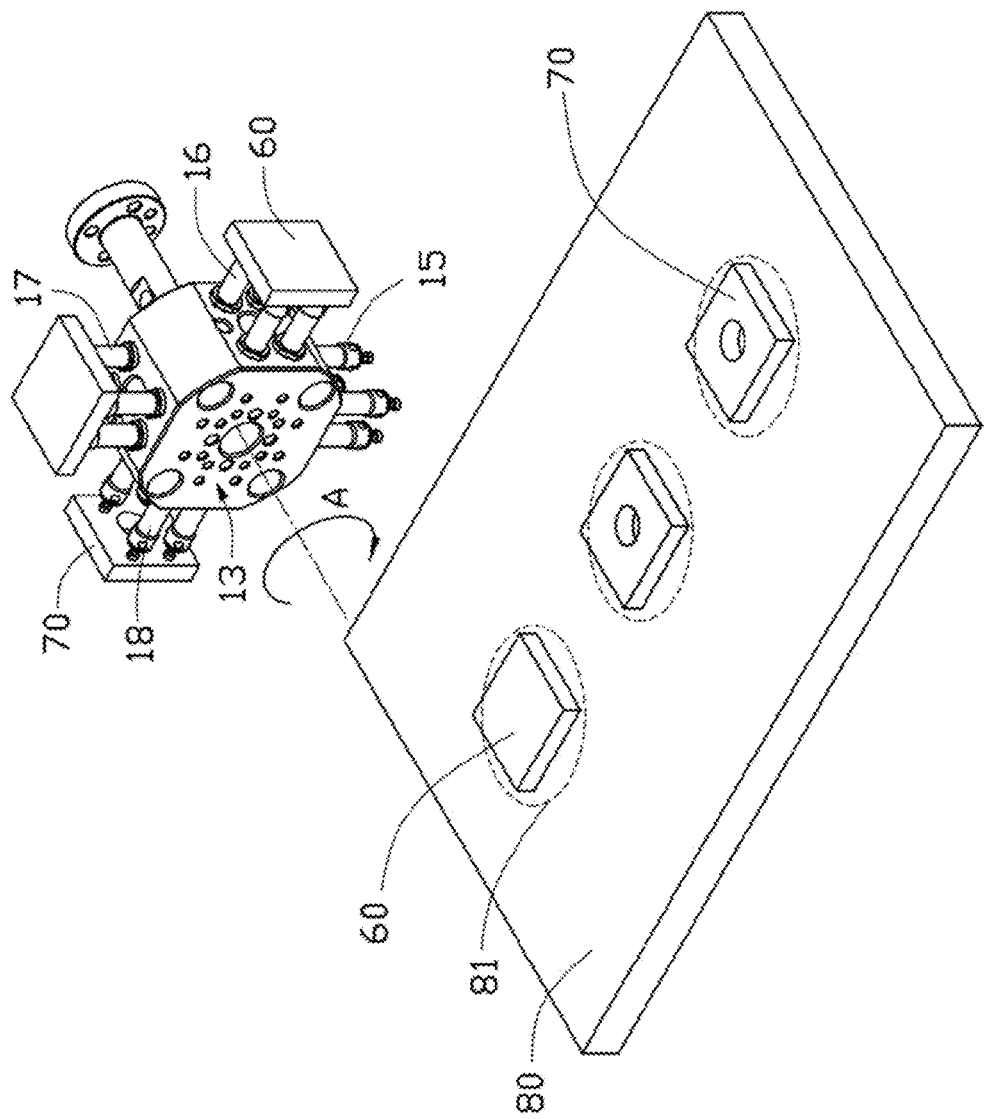
Figure 7:
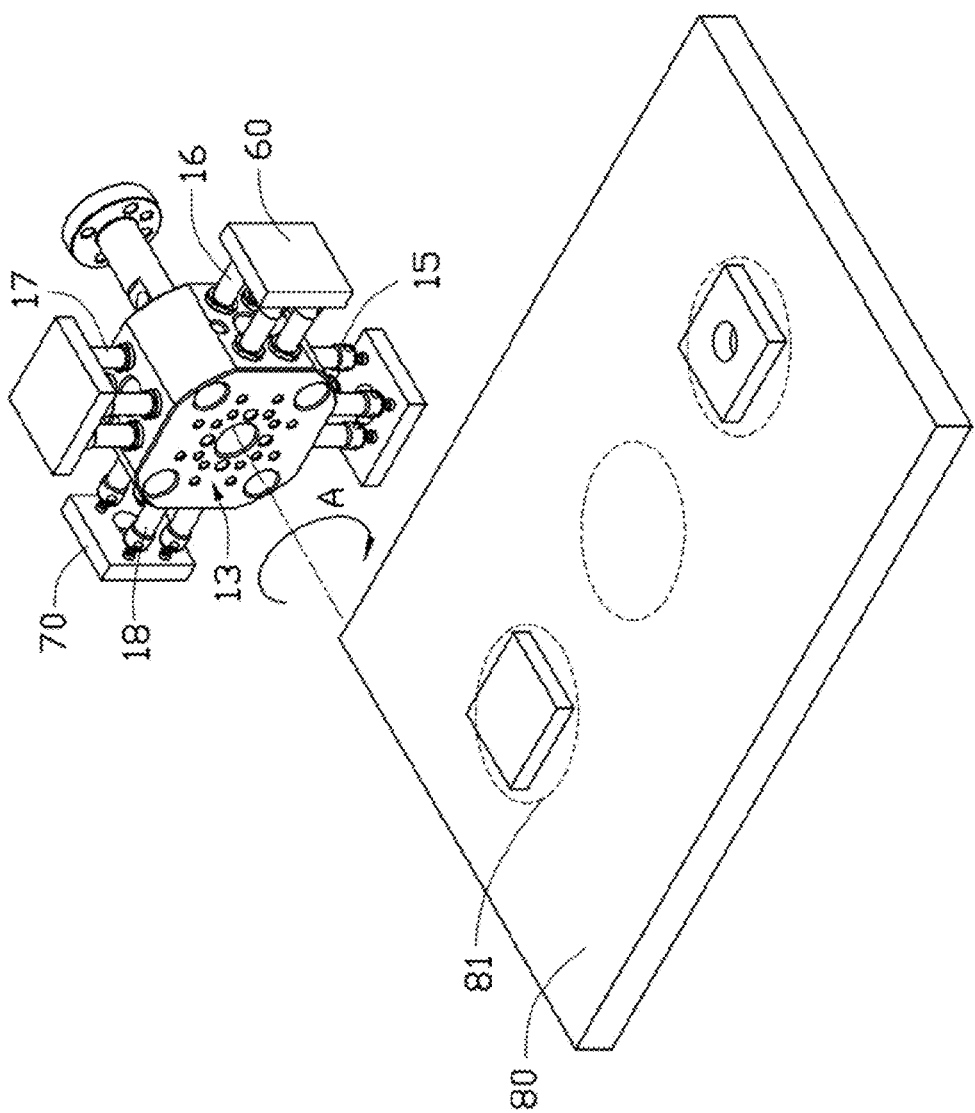
Figure 8:
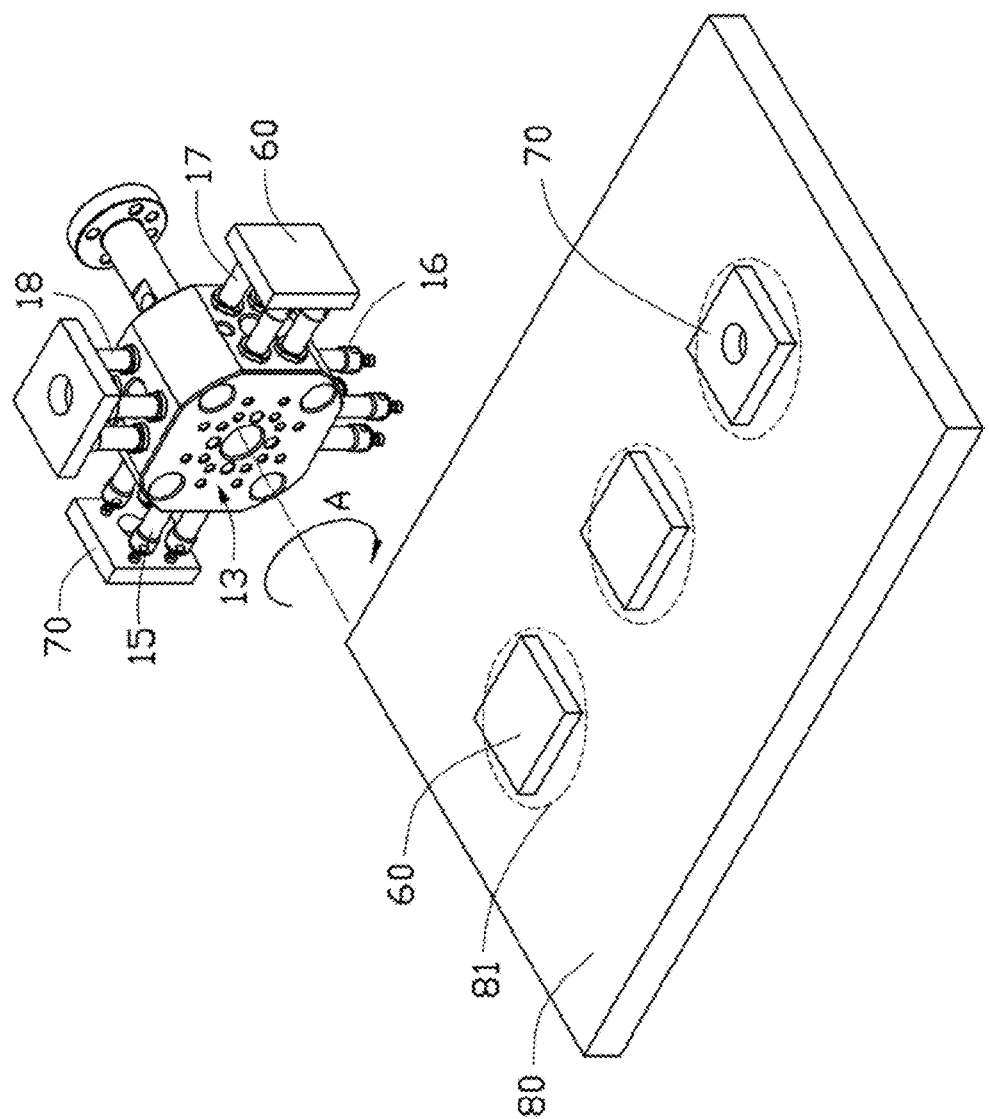
Figure 9:
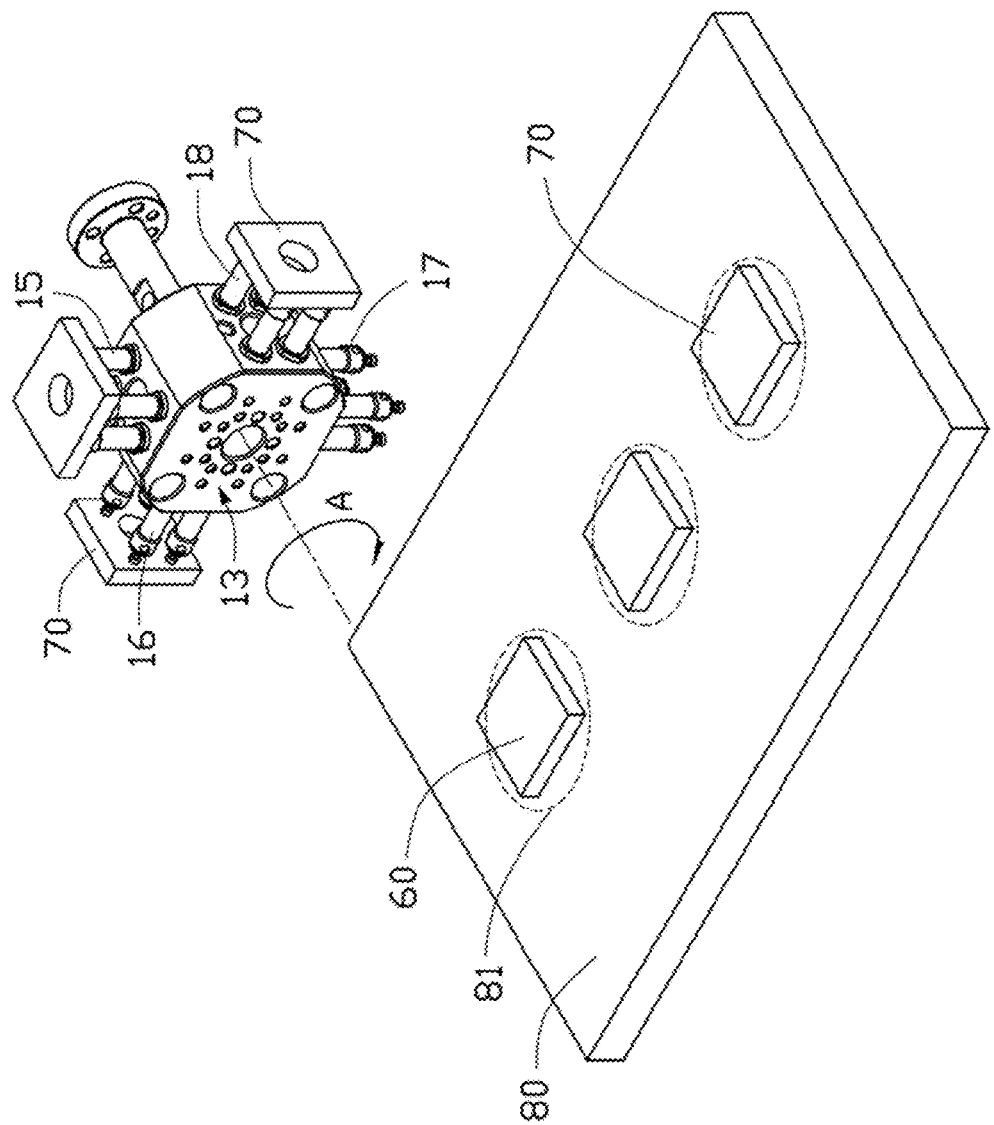

In a step S300, the fourth grasping assembly 18 grasps one machined workpiece 70, on the first of the plurality of machining positions 81 (as shown in FIG. 5). The manipulator 10 further rotates 90° in the direction A, and places the first original workpiece on the first of the plurality of machining positions 81 via the first grasping assembly 15 (as shown in FIG. 6). The manipulator 10 moves to a second of the plurality of machining positions 81, and the first grasping assembly 15 grasps a machined workpiece on the second of the plurality of machining positions 81 (as shown in FIG. 7). The manipulator 10 further rotates 90° in the direction A, and places the second original workpiece on the second of the plurality of machining positions 81 via the second grasping assembly 16 (as shown in FIG. 8). The manipulator 10 moves to a third of the plurality of machining positions 81, and the second grasping assembly 16 grasps a machined workpiece on the third of the plurality of machining positions 81. The manipulator 10 further rotates 90° in direction A, and places the third original workpiece on the third of the plurality of machining positions 81 via the third grasping assembly 17 (as shown in FIG. 9).

The manipulator 10 moves away from the machining center 80. The machined workpieces 70 on the first grasping assembly 15, the second grasping assembly 16, and the third grasping assembly 17 are unloaded from the manipulator 10. The manipulator 10 then reloads a plurality of original workpieces 60 at one time.

Figure 10:
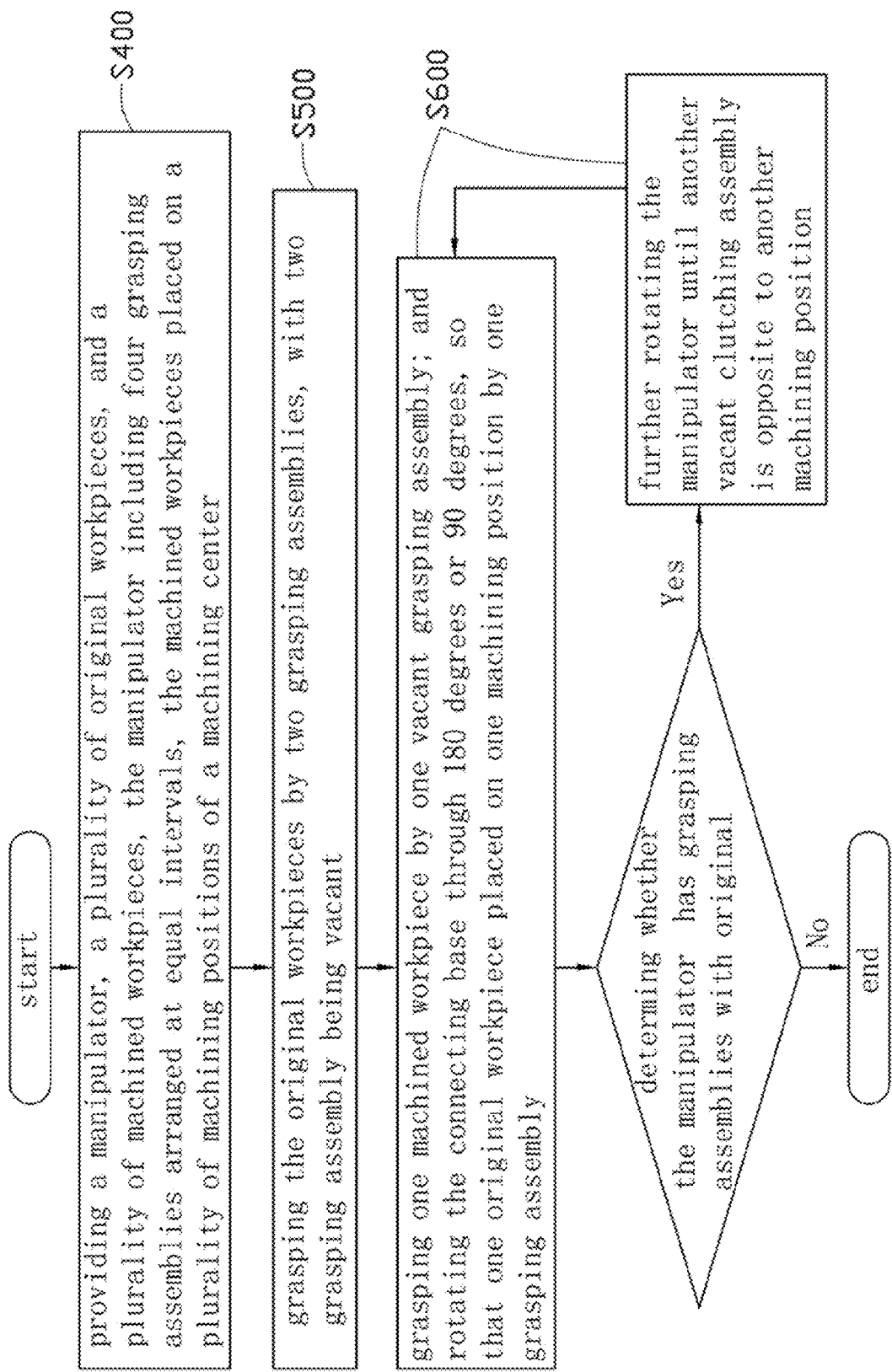
FIG. 10 is a flowchart of another embodiment of a method for reloading workpieces using the manipulator of FIG. 1.

Another embodiment of a method for reloading a plurality of workpieces using the manipulator 10, according to FIG. 10, is also provided.

In a step S400, the manipulator 10, a plurality of original workpieces 60, and a plurality of machined workpieces 70 are provided. The machined workpieces are placed on a plurality of machining positions 81 of a machining center 80.

In the step S500, each of the first grasping assembly 15 and the second grasping assembly 16 grasps an original workpiece 60. The manipulator 10 moves to the first plurality of machining positions 81 of the machining center 80 with the third grasping assembly 17 opposite to the first plurality of machining positions 81. The third grasping assembly 17 grasps a machined workpiece 70 in the first of the plurality of machining positions 81.

In the step S600, the manipulator 10 rotates 180° in the direction A, and the first grasping assembly 15 places the original workpiece 60 in the first of the plurality of machining positions. The manipulator 10 rotates 90° opposite to direction A, and moves to a second of the plurality of machining positions 81. The fourth grasping assembly 18 grasps a machined workpiece 70 on the second of the plurality of machining positions 81. The manipulator 10 further rotates 180° in the direction A, and the second grasping assembly 16 places the original workpiece 60 on the second of the plurality of machining positions 81. The manipulator 10 moves away from the machining center 80. The machined workpieces on the third grasping assembly 17 and fourth grasping assembly 18 are unloaded from the manipulator 10.

In the methods disclosed, before moving to the machining center 80 to reload workpieces 60, one or more grasping assemblies of the manipulator 10 are vacant and the rest grasp original workpieces 60. Therefore, the manipulator 10 can unload the machined workpieces 70 on the machining center 80 and load the original workpieces 60 on the machining center 80 at one time, increasing the efficiency of the manipulator 10.

Figure 11:
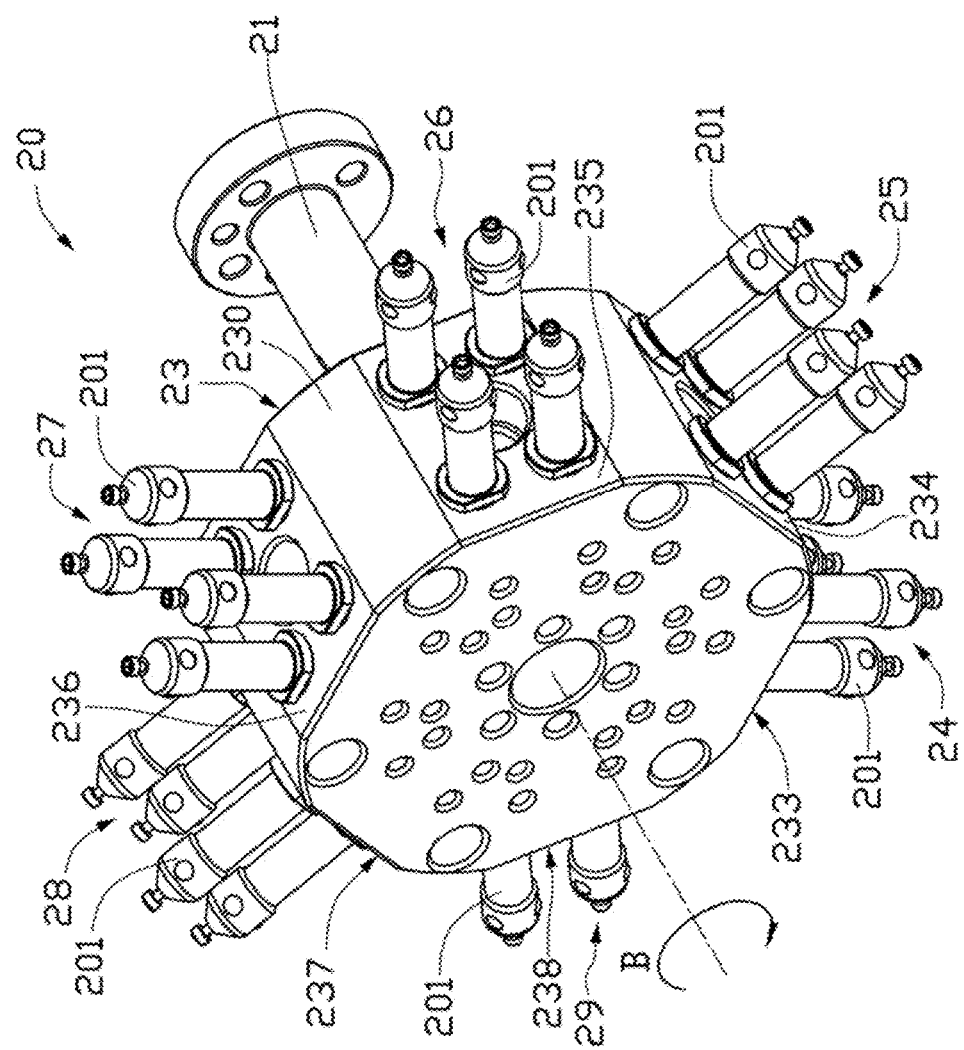
FIG. 11 is an isometric view of a second embodiment of a manipulator.

Referring to FIG. 11, a second embodiment of a manipulator 20 includes a support arm 21, a connecting base 23, a first grasping assembly 24, a second grasping assembly 25, a third grasping assembly 26, a fourth grasping assembly 27, a fifth grasping assembly 28, and a sixth grasping assembly 29. Each of the first grasping assembly 24, the second grasping assembly 25, the third grasping assembly 26, the fourth grasping assembly 27, the fifth grasping assembly 27, and the sixth grasping assembly 27 includes a plurality of substantially parallel grasping poles 201.

The support arm 21 may be a cylindrical pole. An end of the support arm 21 is connected to the driving device, and the other end of the support arm 21 is connected to the connecting base 23. The support arm 21 and connecting base 23 are rotated by the driving device.

The connecting base 23 may be substantially cylindrical or hexagonal. The connecting base 23 includes a first side surface 233, a second side surface 234, a third side surface 235, a fourth side surface 236, a fifth side surface 237 and a sixth side surface 238. The first side surface 233, the second side surface 234, the third side surface 235, the fourth side surface 236, the fifth side surface 237 and the sixth side surface 238 connect in turn via curved surfaces 230. An angle between two adjacent grasping assemblies is about 60°.

Figure 12:
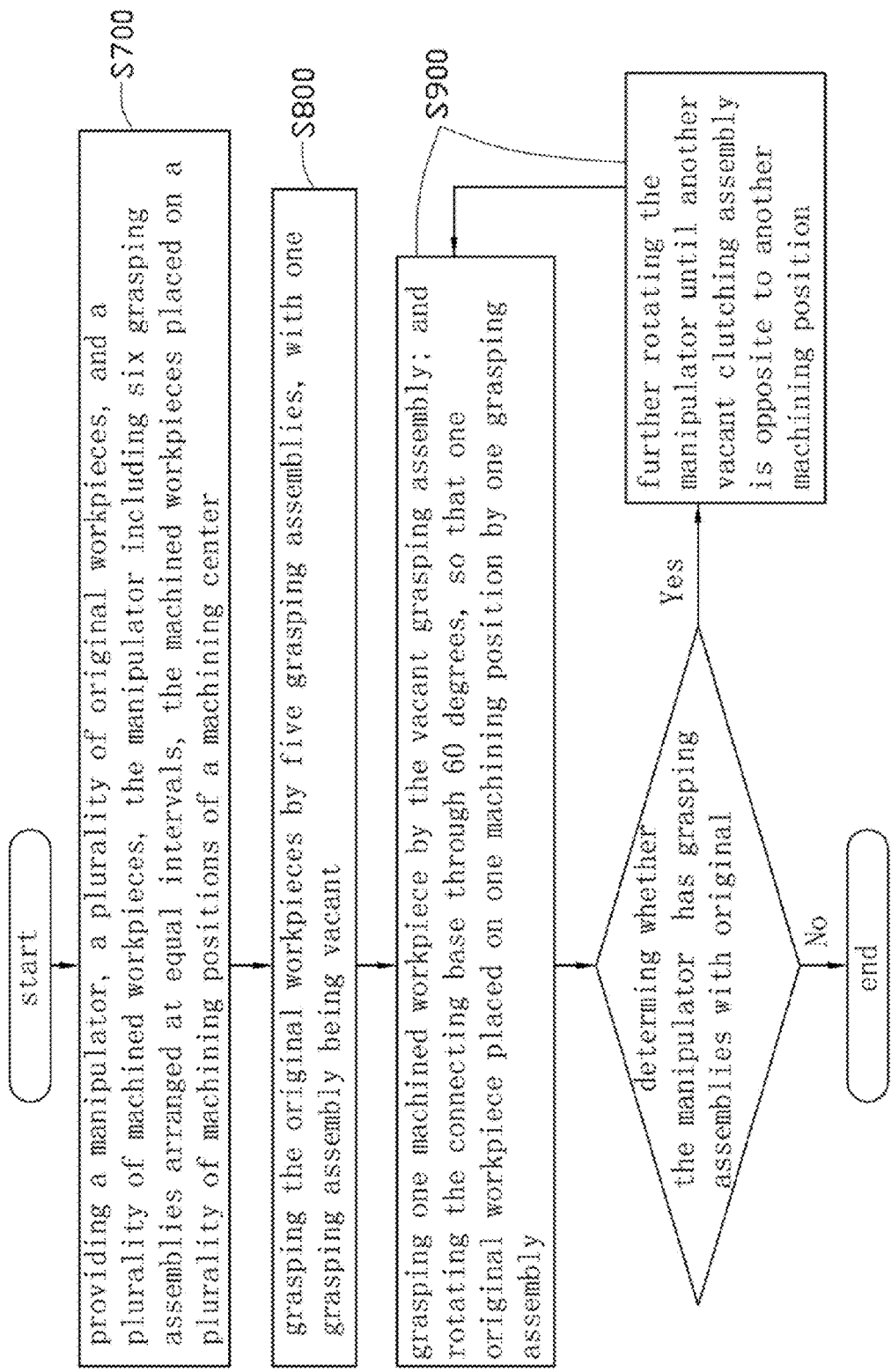
FIG. 12 is a flowchart of one embodiment of a method for reloading workpieces using the manipulator of FIG. 11.

A method for reloading a plurality of workpieces using the manipulator 20, according to FIG. 12, is provided.

In the step S700, the manipulator 20, a plurality of original workpieces 60, and a plurality of machined workpieces 70 are provided. The machined workpieces are placed on a plurality of machining positions 81 of the machining center 80.

In the step S800, the manipulator 20 rotates 60° continuously in a direction B as shown in FIG. 12 until the first grasping assembly 24, a second grasping assembly 25, a third grasping assembly 26, a fourth grasping assembly 27, and a fifth grasping assembly 28 grasp an original workpiece 60 via the grasping poles 201. The sixth grasping assembly 29 is vacant.

In the step S900, when a plurality of original workpieces 60 has been machined to a plurality of machined workpieces 70 on the machine center 80, the manipulator 20 moves to a first of the plurality of machining positions 81 of the machining center 80 with the sixth grasping assembly 29 opposite to the first of the plurality of machining positions 81. The sixth grasping assembly 29 grasps a machined workpiece 70 on the first of the plurality of machining positions 81. The manipulator 20 further rotates 60° in the direction B, and places the original workpiece 60 grasped by the first grasping assembly 24 on the first of the plurality of machining positions 81.

This is repeated until the original workpieces 60 grasped by the second grasping assembly 25, the third grasping assembly 26, the fourth grasping assembly 27, and the fifth grasping assembly 28 are placed on the machining positions 81 and the machined workpieces 70 are grasped by the first grasping assembly 24, the second grasping assembly 25, the third grasping assembly 26, and the fourth grasping assembly 27. The manipulator 20 moves away from the machine center 80, and five machined workpieces 70 are unloaded from the manipulator 10.

Figure 13:
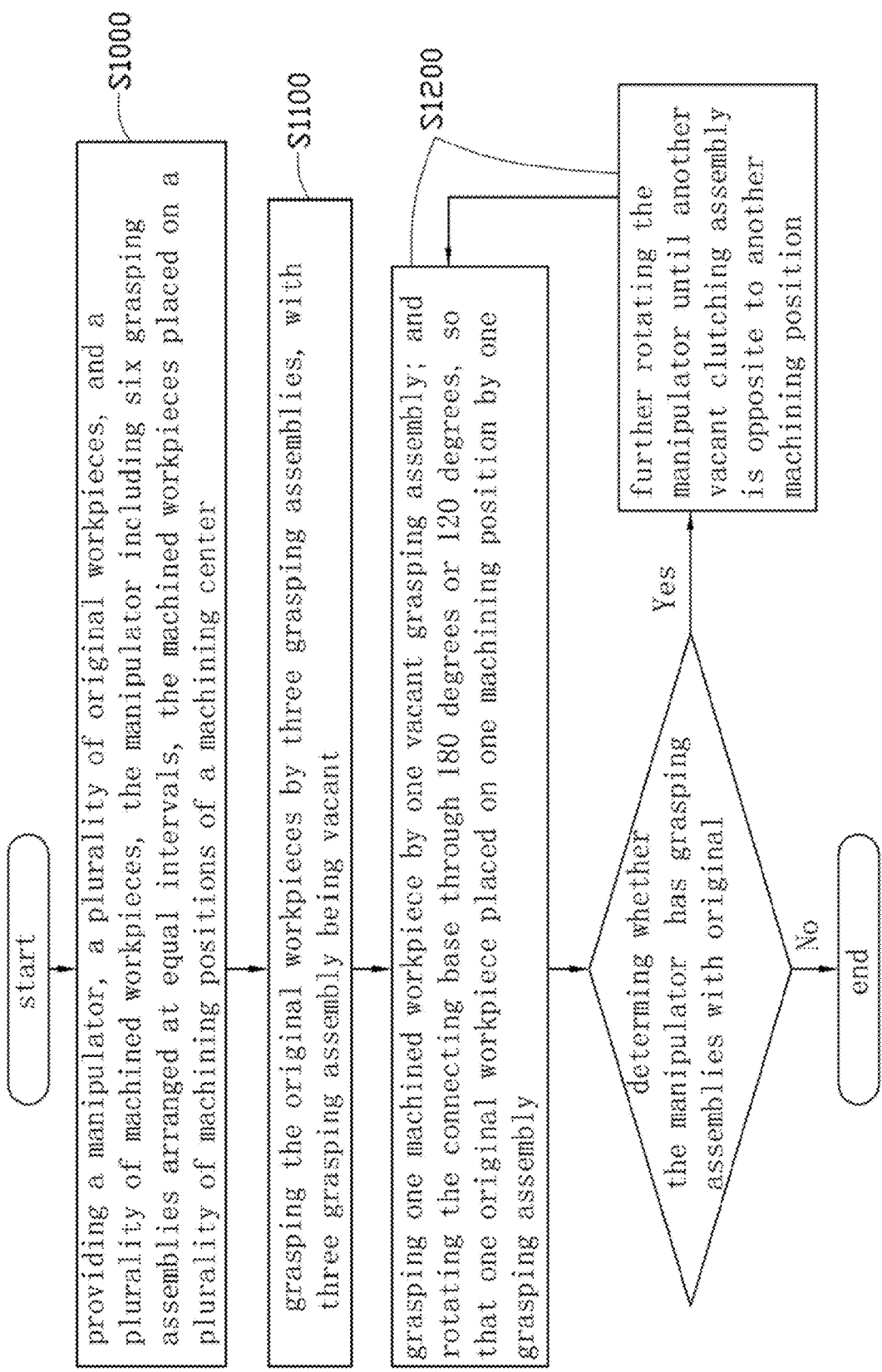
FIG. 13 is a flowchart of another embodiment of a method for reloading workpieces using the manipulator of FIG. 11.

Another method for reloading a plurality of workpieces 60 using the manipulator 20, according to FIG. 13, is also provided.

In the step S1000, the manipulator 20, a plurality of original workpieces 60, and a plurality of machined workpieces 70 are provided. The machined workpieces are placed on a plurality of machining positions 81 of the machining center 80.

In the step S1100, each of the first grasping assembly 24, the second grasping assembly 25, and the third grasping assembly 26 grasps an original workpiece 60. The manipulator 10 moves to the first machining position 81 of the machining center 80 with the fourth grasping assembly 27 opposite to the first machining position 81.

In the step S1200, the fourth grasping assembly 27 grasps a machined workpiece 70 in the first of the plurality of machining positions 81. The manipulator 10 rotates 180° in direction B, and the first grasping assembly 24 places the original workpiece 60 in the first of the plurality of machining positions 81. The manipulator 10 rotates 120° opposite the direction B, and moves to the second of the plurality of machining positions 81. The fifth grasping assembly 28 grasps a machined workpiece 70 in the second of the plurality of machining positions 81. The manipulator 20 further moves and rotates as described, until two original workpieces 60 grasped by the second grasping assembly 25 and the third grasping assembly 26 are placed in the machining positions 81, and two machined workpieces 70 are grasped by the fifth grasping assembly 28 and the sixth grasping assembly 29. The manipulator 20 moves away from the machine center 80, and three machined workpieces 70 are unloaded from the manipulator 20.

Figure 14:
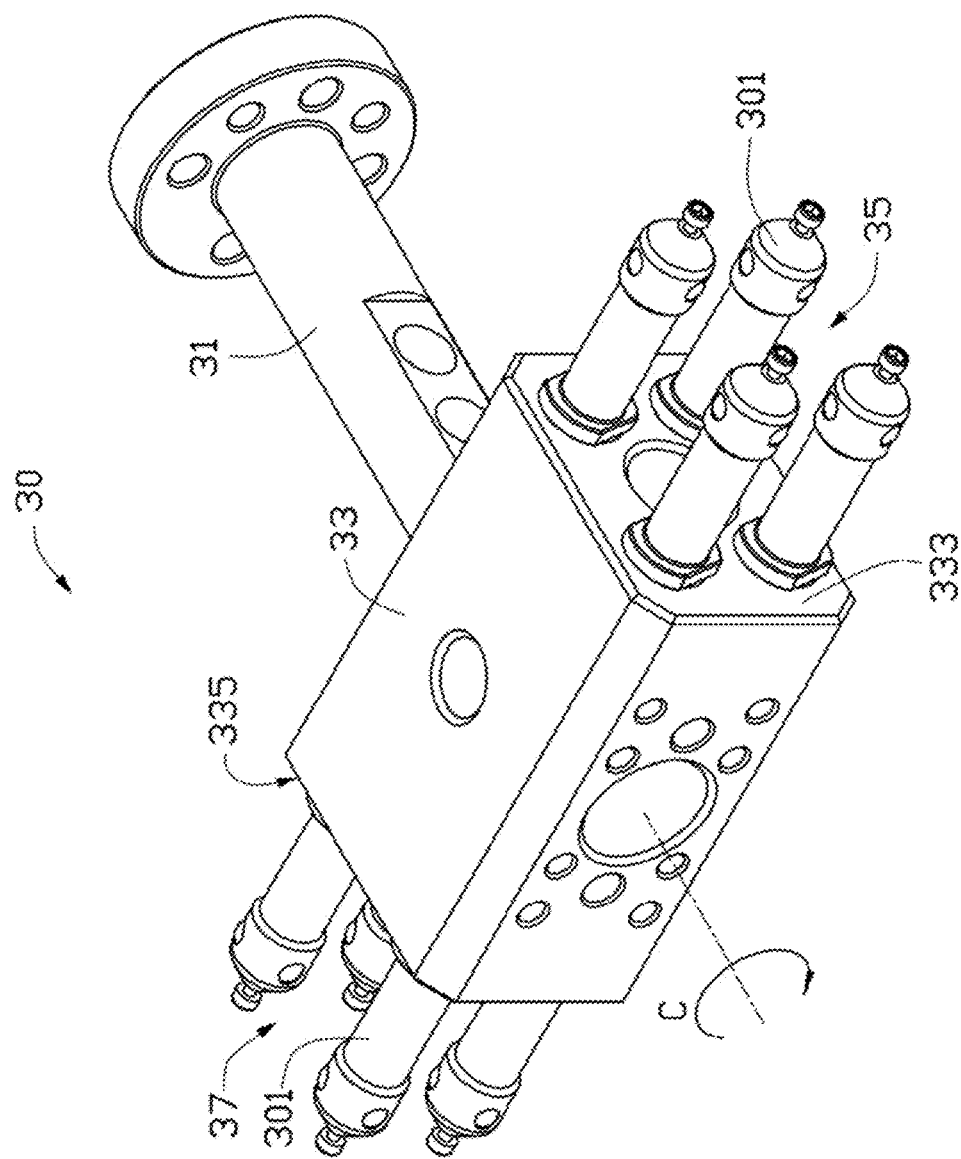
FIG. 14 is an isometric view of a third embodiment of a manipulator.

Referring to FIG. 14, a third embodiment of a manipulator 30 includes a support arm 31, a connecting base 33, a first grasping assembly 35, and a second grasping assembly 37 opposite to the first grasping assembly 35. Each of the first grasping assembly 35 and the second grasping assembly 37 includes a plurality of substantially parallel grasping poles 301.

The support arm 31 may be a cylindrical pole. An end of the support arm 31 is connected to the driving device, and the other end of the support arm 31 is connected to the connecting base 33. The support arm 31 and connecting base 33 are rotated by the driving device.

The connecting base 33 is substantially cubic. The connecting base 33 includes a first side surface 333 and a second side surface 335 opposite to the first side surface 333. The first grasping assembly 35 is substantially perpendicularly positioned on the first side surface 333. The second grasping assembly 37 is substantially perpendicularly positioned on the second side surface 337. The first grasping assembly 35 is aligned with the second grasping assembly 37. That is, an angle between the first grasping assembly 35 and the second grasping assembly 37 is about 180°.

Figure 15:
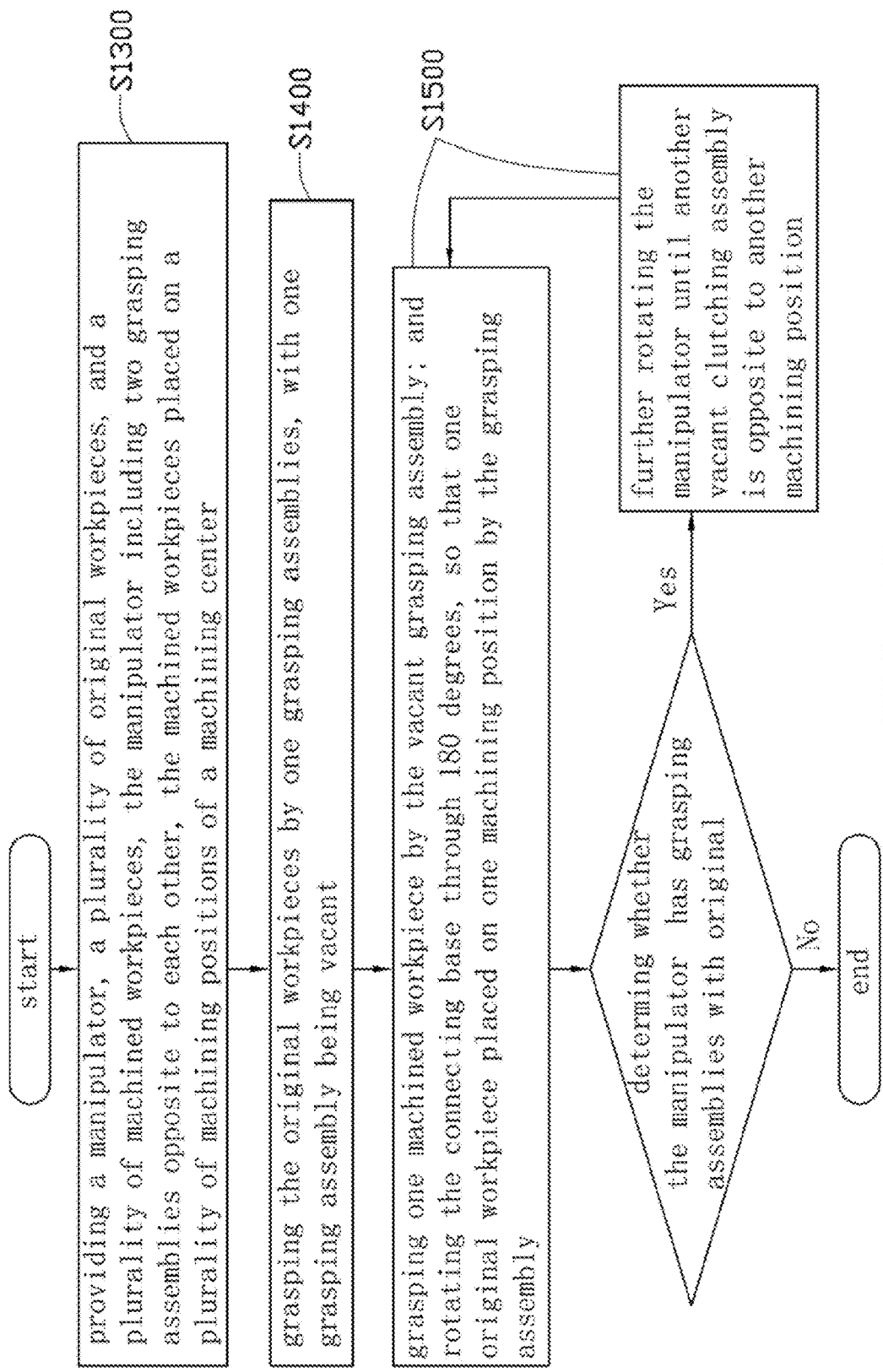
FIG. 15 is a flowchart of one embodiment of a method for reloading workpieces using the manipulator of FIG. 14.

One embodiment of a method for reloading a plurality of workpieces 60 using the manipulator 30, according to FIG. 15, is provided.

In the step S1300, the manipulator 30, a plurality of original workpieces, and a plurality of machined workpieces are provided. The machined workpieces are placed on a plurality of machining positions of the machining center.

In the step S1400, the first grasping assembly 35 grasps an original workpiece 60 via the grasping poles 301. The manipulator 30 rotates 180° in a direction C as shown in FIG. 15, and moves to a machining position 81 of the machine center 80 with the second grasping assembly 37 opposite to the machining position 81.

In the step S1500, the second grasping assembly 37 grasps a machined workpiece 70 on the machining position 81 via the grasping poles 301. The manipulator 30 further rotates 180° in the direction C, and the first grasping assembly 35 places the original workpiece 60 on the machining position 81. The manipulator 30 moves away from the machine center 80, and the machined workpiece 70 is unloaded from the manipulator 30.

It should be pointed out that the manipulator may include eight or more grasping assemblies, with the angle between every two adjacent grasping assemblies remaining the same. Each grasping assembly may include one or more grasping poles according to the size of the workpiece. The connecting base may be other shapes, such as a sphere.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A method for reloading workpieces, comprising:
    providing a manipulator, the manipulator comprising a support arm, a connecting base connected to the support arm and at least three grasping assemblies arranged on a side surface of the connecting base;
    providing a plurality of original workpieces to be machined into machined workpieces on a plurality of machining positions;
    grasping each of the original workpieces by a different one of at least two grasping assemblies of the at least three grasping assemblies, with at least one grasping assembly being vacant;
    grasping one machined workpiece by the at least one vacant grasping assembly;
    rotating the connecting base so that the grasping assembly with the original workpiece is opposite to one machining position, and placing the original workpiece on the machining position by the grasping assembly;
    further rotating the connecting base until another vacant grasping assembly is opposite to another machining position, and the vacant grasping assembly grasping one machined workpiece; and
    repeating grasping the machined workpieces from the machining positions and placing the original workpieces on the machining positions until a last original workpiece is placed on one machining position.

2. The method for reloading workpieces of claim 1, wherein the grasping assemblies are arranged on a side surface of the connecting base at equal intervals.

3. The method for reloading workpieces of claim 1, wherein the side surface of the connecting base comprises four side surfaces substantially perpendicular to each other and the plurality of grasping assemblies comprises four grasping assemblies, each of the four grasping assemblies substantially perpendicularly positioned on one corresponding side surface.

4. The method for reloading workpieces of claim 3, wherein after the step of grasping each of the original workpieces by a different one of at least two grasping assemblies of the at least three grasping assemblies, one grasping assembly is vacant.

5. The method for reloading workpieces of claim 3, wherein after the step of grasping each of the original workpieces by a different one of at least two grasping assemblies of the at least three grasping assemblies, two adjacent grasping assemblies are vacant.

6. The method for reloading workpieces of claim 1, wherein the side surface of the connecting base comprises six side surfaces connecting in turn; the plurality of grasping assemblies comprises six grasping assemblies, each of the six grasping assemblies is substantially perpendicularly positioned on one corresponding side surface.

7. The method for reloading workpieces of claim 6, wherein after the step of grasping each of the original workpieces by a different one of at least two grasping assemblies of the at least three grasping assemblies, two adjacent grasping assemblies are vacant.

8. The method for reloading workpieces of claim 6, wherein after the step of grasping each of the original workpieces by a different one of at least two grasping assemblies of the at least three grasping assemblies, three adjacent grasping assemblies are vacant.

9. The method for reloading workpieces of claim 1, wherein each of the grasping assemblies comprises a plurality of substantially parallel grasping poles.

* * * * *